Oct. 23, 1956  J. BOMMELAER  2,767,439
PRESSURE DEVICE FOR TEXTILE FIBER ROLLING MACHINES
Filed May 26, 1953

INVENTOR
Jean Bommelaer.
BY
ATTORNEY

United States Patent Office 2,767,439
Patented Oct. 23, 1956

2,767,439

PRESSURE DEVICE FOR TEXTILE FIBER ROLLING MACHINES

Jean Bommelaer, Paris, France, assignor to Societe Alsacienne de Constructions Mecaniques, Mulhouse, Haut-Rhin, France, a corporate body Application May 26, 1953, Serial No. 357,599

Claims priority, application France June 19, 1952

4 Claims. (Cl. 19—135)

It is known that the pressure-rollers placed on the drawing-rollers of textile fiber rolling machines must exert strong pressure to make the drawing operation possible.

Different devices have been devised up to the present to obtain this pressure.

An embodiment of the invention, is shown by way of example, in the accompanying drawing.

Figure 1:
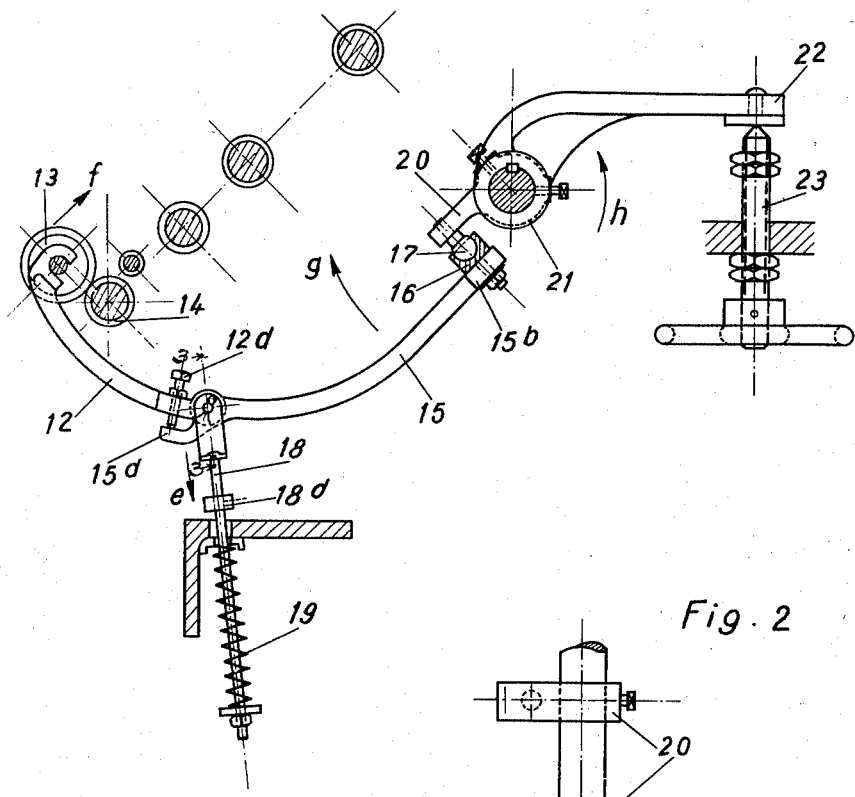
Fig. 1 is a side elevation, partly in section, of the preferred embodiment of my invention.
Figure 2:
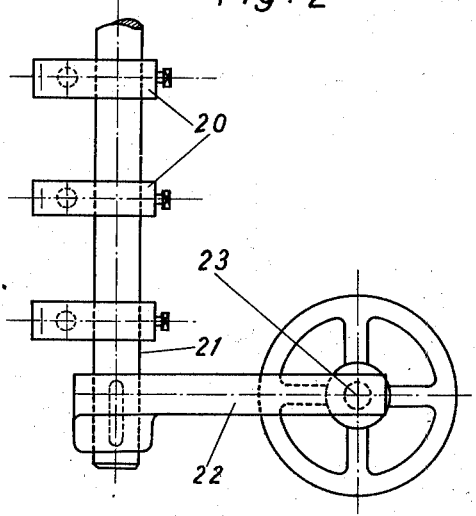
Fig. 2 is a detail top plan view.
Figure 3:
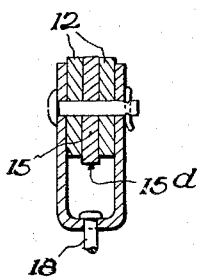
Fig. 3 is a detailed cross sectional view taken on the line 3—3 of Fig. 1.

The device constructed according to the invention comprises essentially a hinged support which is constituted partly, by a hooked rod 12 suspended from the spindle of the pressure-roller 13 placed on the drawing-roller 14 and partly, by a lever 15. This lever includes two arms of which one 15a, very short, bears on an adjustable screw 12d, screwed in the hooked rod 12, and whose other arm 15b, longer, carries at its end a spherical socket 16 in which is engaged a bearing 17. In the example described this bearing is spherical but any other suitable shape can be given it.

A stay-rod 18 coupled to the hinging point of the hooked rod 12 and lever 15, or the inner end of arm 15a, acts on the support in the direction of arrow e. In the present example the stay-rod is urged downwardly by a spring 19, but any other means of traction, a weight for instance, can likewise be used.

As pivotal motion between the hooked rod 12 and lever 15 in the direction of arrow e is prevented by screw 12d and the pressure-roller 13 overhangs drawing-roller 14, the support extends between the point of contact of the pressure-roller on the drawing-roller and the bearing 17. There is thus obtained on the drawing-roller, considerable pressure with a relatively weak tension of the stay-rod 18.

The screw 12d likewise serves for adjusting the position of the pressure-roller in relation to the drawing-cylinder, by displacing in either one direction or the other their point of contact.

To take down the pressure-roller, simply push same beyond the culminating point of the drawing-roller in the direction of the arrow f. The hooked rod 12, hinged on lever 15, then releases screw 12d from its contact with lever 15a, thus permitting to disengage without any effort lever 15 with its socket 16 of bearing 17.

Briefly, it is likewise possible to change the pressure or relieve the rollers without increasing the compression of spring 19. For this purpose bearing 17 is placed on a lever 20 secured to a shaft 21 extending the machine. This shaft 21 is secured against motion by a lever 22 actuated by an adjustable stop screw 23 fixed to the frame of the machine. To relieve the pressure-rollers, simply turn screw 23 for example by means of a handwheel so as to turn the shaft 21 which, through the action of the pressure exerted by the lever 15 on bearing 17 of lever 20 then turns in the direction of the arrow g. When the bearing 17 rises, it causes pressure-roller 13 to approach drawing-roller 14 and with it parts 12—15, to descend until the stop 18a, secured to the stay-rod 18, engages the frame and thus neutralizes the action of the spring. To put the roller under load again, turn shaft 21 in the opposite direction according to arrow h by means of the adjustable screw 23 and lever 22 thus raising of the support and eventually gives the spring its initial compression again by disengaging the stop 18a secured to the stay-rod 18 of the frame of the machine.

What I claim is:

1. In textile fiber rolling machines and the like, the combination comprising a frame, a drawing roller, a pressure roller engaging the drawing roller, and having its axis disposed in an inclined plane containing the axis of the drawing roller, a support having one end connected to the pressure roller, a lever pivoted to the other end of the support, and having one of its arms disposed along the support, adjustable means carried by the support and determining the angle included between the support and lever, means movably mounted on the frame and fulcrumming the lever between its arms, a second lever movably connected at one end to the outer end of the second arm of the first lever, a rotatable shaft rigid with the other end of the second lever and means turning the shaft and swinging the second lever, the first lever and support to vary the pressure of the pressure roller against the drawing roller.

2. The combination according to claim 1, and wherein the means fulcruming the first lever is a rod and a spring urges the rod downward.

3. The combination according to claim 1, and wherein the adjustable means carried by the support is a screw.

4. The combination according to claim 1, and wherein the means angularly adjusting the shaft is a third lever and an operable screw engageable therewith and threaded in the frame.

References Cited in the file of this patent

UNITED STATES PATENTS

| | | |
|---|---|---|
| 2,381,856 | Rabasa | Aug. 7, 1945 |
| 2,525,647 | Burnham et al. | Oct. 10, 1950 |

FOREIGN PATENTS

| | | |
|---|---|---|
| 9,254 | Great Britain | of 1842 |
| 21,557 | Great Britain | Mar. 22, 1913 |
| 158,072 | Germany | Jan. 21, 1905 |
| 437,161 | France | Feb. 10, 1912 |